(No Model.)

C. W. SELVIDGE.
ANT TRAP.

No. 602,410. Patented Apr. 12, 1898.

Witnesses.
T. L. McCabe
Philip Masi

Inventor.
C. W. Selvidge
by E. W. Anderson
his Attorney.

UNITED STATES PATENT OFFICE.

CHARLES W. SELVIDGE, OF MEXIA, TEXAS, ASSIGNOR OF ONE-HALF TO JACOB BENJAMIN PARNELL, OF SAME PLACE.

ANT-TRAP.

SPECIFICATION forming part of Letters Patent No. 602,410, dated April 12, 1898.

Application filed August 10, 1897. Serial No. 647,731. (No model.)

*To all whom it may concern:*

Be it known that I, CHARLES W. SELVIDGE, a citizen of the United States, and a resident of Mexia, in the county of Limestone and State of Texas, have invented certain new and useful Improvements in Ant-Traps; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
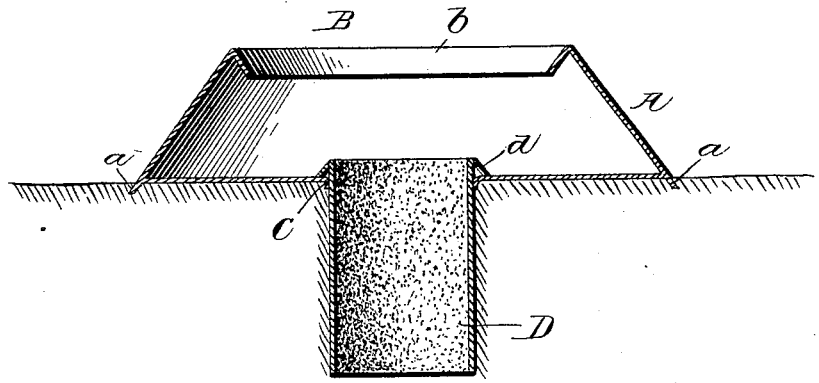
Figure 2:
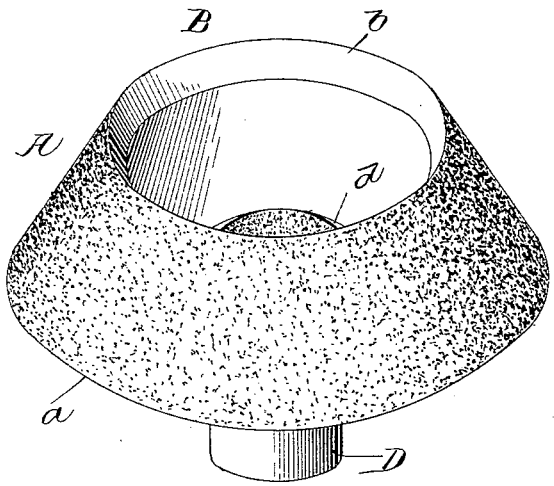

Figure 1 of the drawings is a vertical section of my invention, and Fig. 2 is a perspective view of the same.

This invention is designed to provide an ant-trap of improved character; and it consists in the novel construction and combination of parts, all as hereinafter described, and pointed out in the appended claim.

Referring to the accompanying drawings, the letter A designates the body portion of my trap, which consists of a receptacle of any suitable form, having inwardly-inclined walls and an opening at both top and bottom. In the drawings this receptacle is shown as having the form of a hollow truncated cone having a large central opening B at the top and the smaller opening C in its bottom. The edge of the opening B has a broad inwardly and downwardly inclined flange $b$. The cone-shaped wall of the receptacle is preferably carried below the bottom wall thereof, as indicated at $a$, to form a projecting flange.

D designates that part of the trap which constitutes the main entrance thereto and which consists of a short open tube of the proper diameter to fit neatly in the opening C, through which it extends. The upper end of the said tube has a broad outwardly and downwardly extended surrounding flange $d$. The inner surface of said tube and the outer surface of the wall of the receptacle A are roughened in a suitable manner to enable the ants to readily crawl up the same. This may be accomplished by painting said surface and sprinkling sand in the paint or in any other suitable manner. The flanges $b$ and $d$ are not roughened.

The trap is used in the following manner: The receptacle A is placed over the ant-burrow, with its opening C surrounding the ingress and egress to such burrow, the flange $a$ being preferably embedded in the surrounding earth to a greater or less extent. The tube D is stationary and extends down through the opening C into the ground around the burrow. When so arranged, it will be apparent that the only egress from the burrow is through the said tube into the receptacle, from which the ants cannot escape. Ants outside the burrow in attempting to return to the same crawl up the roughened outer surface of the receptacle and into the same, where they are caught.

The surrounding bottom flange $a$, above referred to, is of considerable importance. This flange is to be pushed down into the ground to thereby cut off the return to the burrow of all ants which may be outside at the time the trap is placed and also to prevent the escape of ants from the burrow except by way of the trap. Were it not for this flange the irregularities and unevenness of the ground would afford passage-ways by which the ants could return to and escape from the burrow underneath the bottom of the trap without entering the trap.

Having thus described my invention, what I claim as new, and desire to secure by Letters Patent, is—

The herein-described ant-trap, consisting of the frusto-conical receptacle, exteriorly roughened, and having its top opening provided with a guard-flange, and which is formed at the bottom with an exterior downwardly-projecting peripheral flange extension $a$ which is adapted to be inserted into the ground for the purpose specified, and the interiorly-roughened ingress-tube which extends up through the bottom of the said receptacle, substantially as specified.

In testimony whereof I affix my signature in presence of two witnesses.

CHAS. W. SELVIDGE.

Witnesses:
T. BENNETT,
E. L. DUKE.